(12) United States Patent
Butikofer et al.

(10) Patent No.: US 6,574,443 B1
(45) Date of Patent: Jun. 3, 2003

(54) VALUE BASED IMAGE QUALITY

(75) Inventors: Chet Butikofer, Meridian, ID (US); Cori Schaefer, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/992,108

(22) Filed: Nov. 19, 2001

(51) Int. Cl.[7] ............................................. F03G 15/00
(52) U.S. Cl. .............................. 399/79; 705/400
(58) Field of Search .................... 399/79, 80; 358/1.9; 700/235; 705/400

(56) References Cited

U.S. PATENT DOCUMENTS

| | | | |
|---|---|---|---|
| 5,038,293 A | * 8/1991 | Goodman | 700/235 |
| 5,850,584 A | * 12/1998 | Robinson et al. | 399/79 |
| 5,993,048 A | 11/1999 | Banks et al. | |
| 6,029,182 A | 2/2000 | Nehab et al. | |
| 6,064,838 A | 5/2000 | Maruta et al. | |
| 6,147,704 A | 11/2000 | Ito et al. | |
| 6,279,013 B1 | 8/2001 | LaMarca et al. | |
| 6,356,359 B1 | * 3/2002 | Motamed | 358/1.9 |

* cited by examiner

*Primary Examiner*—Joan Pendegrass

(57) ABSTRACT

Methods and apparatus to facilitate allowing a user to vary the quality of an output image in exchange for a variable cost. Each quality has an associated cost. By allowing the user to select a value relationship of a quality and its associated cost, the user is provided with an opportunity to receive an output image that provides the most value to the user.

23 Claims, 2 Drawing Sheets

VALUE BASED IMAGE QUALITY

TECHNICAL FIELD OF THE INVENTION

The present invention relates generally to imaging devices, and in particular to methods and apparatus to facilitate variable image quality output based on a value to a user.

BACKGROUND OF THE INVENTION

Coin-operated or other pay devices are available to produce images. These devices may produce an image from an original supplied by a user, e.g., self-service copiers found in most public libraries or self-service photo printers found in many photographic outlets. Alternatively, these devices may produce an image generated by or through the apparatus itself, e.g., customized greeting-card kiosks found in shopping malls or other retail outlets. Payment may be supplied to the device in the form of coins, currency, credit or debit card, tokens or other forms of payment. Alternatively, the device may provide some indication of the cost to the user for payment elsewhere. Using a customized greeting card as an example, an imaging device can print a barcode or other indicia on the card itself indicative of a price to be paid by the user. As another example, the imaging device may be activated only through the use of a tally device. A tally device typically counts the number of images produced by the user. When the tally device is returned to an administrator of the imaging device, the user is charged for the tallied image count.

Typically, a user is charged based on the imaging device being chosen for use. The user, if presented with a choice, can choose between imaging devices based on a desired quality of the output image. For example, a copy center may have color copiers and black & white copiers available for use. The cost to use a color copier is generally higher than the cost to use a black & white copier. If a user wants a color copy, they will have to choose and pay for the use of a color copier. Likewise, if a user wants a black & white copy, they will most likely choose and pay for the use of a black & white copier due to its lower cost. However, the user generally pays the color copier price to use a color copier regardless of whether they are making a copy of a black & white original or a color original.

For the reasons stated above, and for other reasons stated below that will become apparent to those skilled in the art upon reading and understanding the present specification, there is a need in the art for alternative methods and apparatus providing a user with flexibility regarding cost and quality of an image output.

SUMMARY

Methods and apparatus are described herein to facilitate allowing a user to vary the quality of an output image in exchange for a variable cost. Each quality has an associated cost. By allowing the user to select a value relationship of a quality and its associated cost, the user is provided with an opportunity to receive an output image that provides the most value to the user.

For one embodiment, the invention provides a method of generating an output image. The method includes generating a set of one or more value relationships associated with producing the output image. Each value relationship includes a cost to a user to receive the output image having a corresponding quality. The method further includes generating the output image in response to a user selection of one of the value relationships. The output image has the quality associated with the selected value relationship.

For another embodiment, the invention provides an imaging device. The imaging device includes a formatter for rendering image data into a printable image, a print engine for producing an output image from the printable image, and a processor. The processor is adapted to generate a first cost to a user of the imaging device to receive the output image having a first quality and to generate a second cost to the user of the imaging device to receive the output image having a second quality. The processor is adapted to direct the formatter and the print engine, as necessary, to generate the output image in accordance with the first quality if the user selects either the first quality or the first cost and the processor is adapted to direct the formatter and the print engine, as necessary, to generate the output image in accordance with the second quality if the user selects either the second quality or the second cost.

For yet another embodiment, the invention provides an imaging system. The system includes an imaging device for generating an output image in response to image data. The system further includes a processor adapted to generate a set of one or more value relationships associated with producing the output image, wherein each value relationship comprises a cost to a user to receive an output image having a corresponding quality. The system still further includes a user interface for communicating the set of value relationships to the user and for accepting a selection of one of the value relationships by the user. The processor is further adapted to direct the imaging device to generate the output image having the quality associated with the value relationship selected by the user.

Further embodiments of the invention include apparatus and methods of varying scope.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

Imaging devices can typically produce an output image at a variety of different quality levels. One common quality is output resolution. For example, an imaging device may be capable of generating an output image at resolution levels of 150 dots per inch, 300 dots per inch and 600 dots per inch. While a higher resolution level results in a crisper resulting image, it can also come at a cost of slower device operation or, possibly, higher consumption of marking materials, e.g., toner, ink, etc. Another quality is media type. An imaging device may have multiple media types available, e.g., standard and bond paper stocks, each with a corresponding cost. Other examples of qualities include color type, output speed, finish and consumable usage levels. As used herein, quality includes one or more items descriptive of characteristics of an output image or its manner of production. For example, in producing an output image on a color laser printer, a black & white output image on standard paper stock and produced with half toner usage may be associated with a first quality while a color output image on bond paper stock and produced with full toner usage may be associated with a second quality. The output image having the second quality would generally have a higher cost of production versus that of an output image having the first quality.

Each quality can be expressed in a value relationship to a user of the imaging device. This value relationship represents the cost to the user for a corresponding quality of the output image. By presenting two or more value relationships to the user, the user is able to perform a cost/benefit analysis based on their own criteria. The user may then choose to receive an output image having the quality, and thus the value relationship, that gives the user the highest benefit for their money.

Figure 1:
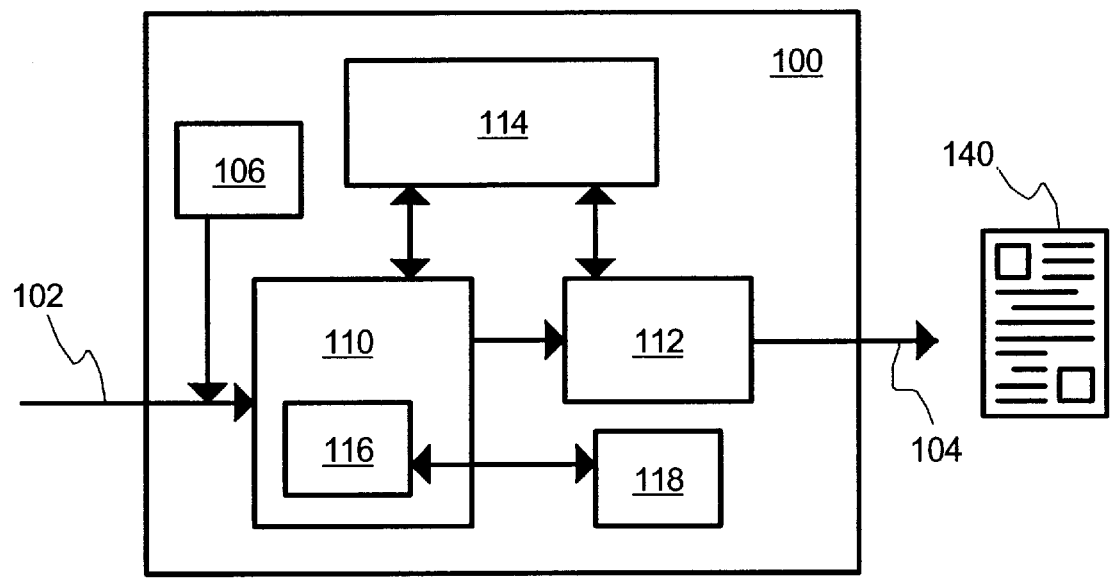
FIG. 1 is a schematic of an imaging device in accordance with an embodiment of the invention.

FIG. 1 is a schematic of an imaging device 100 in accordance with an embodiment of the invention. The imaging device 100 accepts image data on an input 102. The input 102 is some sort of communication or I/O (input/output) port for receiving communications from an external device (not shown), e.g., a computer workstation or other processor-based device. Examples include a parallel communication port, a serial communication port, a Universal Serial Bus (USB) connection, an IR (infrared) communication port and other such wired and wireless communication ports. While discussed herein for receiving communications, the communication ports used in most imaging devices are adapted for bi-directional communications. Thus, the input 102 used for receiving data from an external device would generally further be capable of providing information, e.g., status information, from the imaging device 100 to the external device.

The image data is used by the imaging device 100 to produce the output image 140. The image data is typically created on the external device in a form that is understandable by the imaging device 100. For example, an image can be created or displayed in a document, graphic or other application of a computer workstation. If a user desires to receive a tangible copy of the image, they generally issue a print command from the application they used to generate or otherwise display the image. The data representing the image in the application is then converted by a device driver into a form understood by the imaging device associated with the device driver. Typically, each imaging device brand and type has its own device driver. The image data is generally in a page description language (PDL) providing information to the imaging device 100 necessary to produce a tangible copy of the original image.

A formatter 110 of the imaging device 100 receives the image data and converts or renders it into a printable image. At this stage, the information is typically raster data. The print engine 112 takes this printable image and produces the tangible output image 140 at an output 104. The print engine 112 represents the mechanical aspects of the imaging device 100 used to produce the tangible copy of the original image. As an alternative, or in addition, to receiving image data from an external device, the imaging device 100 may include an image generator 106, e.g., an image scanner such as a copier bed or an image capture device such as a digital camera.

The imaging device 100 further includes a user interface 114 for displaying messages, menus, status and other information to a user of the imaging device 100. The user interface 114 further includes an input device for receiving information from the user, such as menu choices, information requests, data input and the like. Some common examples include a liquid crystal display (LCD) with a keypad, a touch screen or a monitor and keyboard. For one embodiment, the user interface 114 is in communication with the formatter 110 for receiving information from and providing information to the formatter relating to rendering of the image data. For another embodiment, the user interface 114 is in communication with the print engine 112 for receiving information from and providing information to the print engine 112 relating to the production of the output image. Preferably, the user interface 114 is in communication with both the formatter 110 and the print engine 112.

The imaging device 100 further includes a processor 116. Although shown as integral to the formatter 110, the processor 116 may be independent of the formatter 110. The processor 116 is adapted to perform methods in accordance with embodiments of the invention in response to computer-readable instructions. These computer-readable instructions are stored on a computer-usable media and may be in the form of either software, firmware or hardware. In a hardware solution, the instructions are hard coded as part of a processor, e.g., an application-specific integrated circuit (ASIC) chip. In a software or firmware solution, the instructions are stored for retrieval by the processor. Some additional examples of computer-usable media include static or dynamic random access memory (SRAM or DRAM), read-only memory (ROM), electrically-erasable programmable ROM (EEPROM), magnetic media and optical media, whether permanent or removable. For the embodiment depicted in FIG. 1, the imaging device 100 includes a computer-usable media 118 in communication with the processor 116.

The processor 116 is adapted to generate costs to a user of the imaging device 100 to receive an output image 140 having one or more different qualities. Each quality, or each item making up the quality, has an associated effect on the cost to produce the output image 140. These costs relationships may be stored in the media 118 such that the processor 116 can be used to generate a cost to the user to generate the output image 140. The resulting cost owed by the user would typically be estimated to be in excess of an actual cost of generating the output image 140, although it is not necessary to do so.

The cost owed by the user of the imaging device 100 can be based on an average cost per page. For example, it may be established that an average page of an output image 140 contains y % coverage and uses x units of a marking material for that coverage level. Thus, the cost owed by the user to produce the output image 140 can assume average coverage and thus be based at least in part on using x units of marking material per page. Alternatively, the coverage of each page of the output image 140 can be estimated from the image data such that the actual usage of marking material can be estimated, with the cost being based at least in part on the expected usage of marking material.

As an alternate to estimating marking material usage, the actual usage may be measured. Currently, some toner and ink cartridges are capable of measuring a level of the remaining marking material. If such systems are refined to the point of differentiating a level between a beginning of a print job and the end of a print job, actual usage could be used to calculate a cost owed by the user. Note, however, that actual usage determined after completion of the job will delay the availability of the cost; an estimated cost should still be provided to the user to establish the value relationship even if the actual cost owed by the user is determined after completion. Additional aspects that may be considered post-completion include actual mechanical wear, such as a number of rotations of a mechanism of the print engine 112 to gauge the mechanical wear.

A variety of cost considerations can be used in the calculation of the cost owed by the user. The cost can account for wear and tear on the imaging device. For example, high print coverage can be expected to reduce the expected life of the imaging device between repair or maintenance. Different print media types can also be expected to affect the life of the imaging device. Full color images can be expected to be more expensive than black & white images. Higher weight print media is generally more expensive than lower weight print media. Different finishes may be available that also affect cost. For example, a glossy or matte finish may be applied to the output image 140 at an additional cost.

Once the costs are generated for the various qualities, the value relationships may be displayed to the user via the user interface 114. For one embodiment, the qualities used in generating the value relationships are predetermined. As an example, the imaging device 100 may display a cost for a black & white output image 140 and a cost for a color output image 140, or a cost for an output image 140 produced at full consumable usage rates and a cost for an output image 140 produced at some reduced consumable rate, or some other combination of two or more qualities. For another embodiment, the qualities used in generating the value relationships are chosen by the user. As an example, the user may be presented with a list of options or capabilities of the imaging device. The user can select from these options to define the quality of the resulting output image 140. The value relationship from this process can be determined after the user completes the selection process. Alternatively, the value relationship can reflect the cost as the user makes each choice, thus providing concurrent feedback on the cost of their selections.

Whether the user is presented with a list of cost/quality combinations or the user builds a cost/quality combination, the user then selects a value relationship associated with the resulting quality they would like to see in their output image 140. In response to the user selection of a value relationship, the processor 116 directs the formatter 110 and/or the print engine 112 to produce the output image 140 in accordance with the corresponding quality. This direction may include changes to the way the formatter 110 renders the image data, including resolution level. Alternatively, or in addition, this direction may include changes to the way the print engine 112 produces the output image 140 including output rate (e.g., pages per minute), consumable usage rates, print media type, color type, finish and the like.

The direction of the processor 116 may further include changes to the image data or printable image. For example, for retail outlets, it may be desirable to mark the output image 140 with the cost owed by the user. Thus, the processor 116 may generate an indication of the cost owed by the user and then alter the image data or printable image to include this indication. The indication of the cost can be a human-readable indicia, such as a price or price code. Alternatively, the indication of the cost can be a computer-readable indicia, such as a barcode. Such is common in printing out customized greeting cards, where a barcode is generally printed on the back of the card for scanning at the checkout register.

As an alternative to providing an indication of the cost owed by the user on the output image 140, the user interface 114 may include some mechanism to receive or record a cost owed by the user. Some examples include coin-drop mechanisms and currency feeders common on vending machines, credit and debit card readers common on gasoline pumps, tally device ports for receiving and updating a tally device used on many self-service copiers, and other such mechanisms. As a further alternative, the processor 116 may store the cost owed by the user on the computer-usable media 118 for later communication to or retrieval by an administrator of the imaging device 100. Other methods of receiving, recording, displaying or otherwise indicating a cost owed by the user may also be used with embodiments of the invention.

For one embodiment, the imaging device 100 generates the output image 140 only after receiving payment by the user, e.g., by cash, credit or debit. Alternatively, the imaging device 100 may simply record, display or otherwise indicate the cost owed by the user and permit generation of the output image 140 regardless of whether payment is first received. For one embodiment, the processor 116 is adapted to save user preferences or defaults on the computer-usable media 118. This can be established by receiving an indication of the user's identity through the user interface 114 and associating the user's identity with their behavior, such as a most-recently selected quality, a most-commonly selected quality, a highest selected quality, a lowest selected quality and a user-designated default quality.

Figure 2:
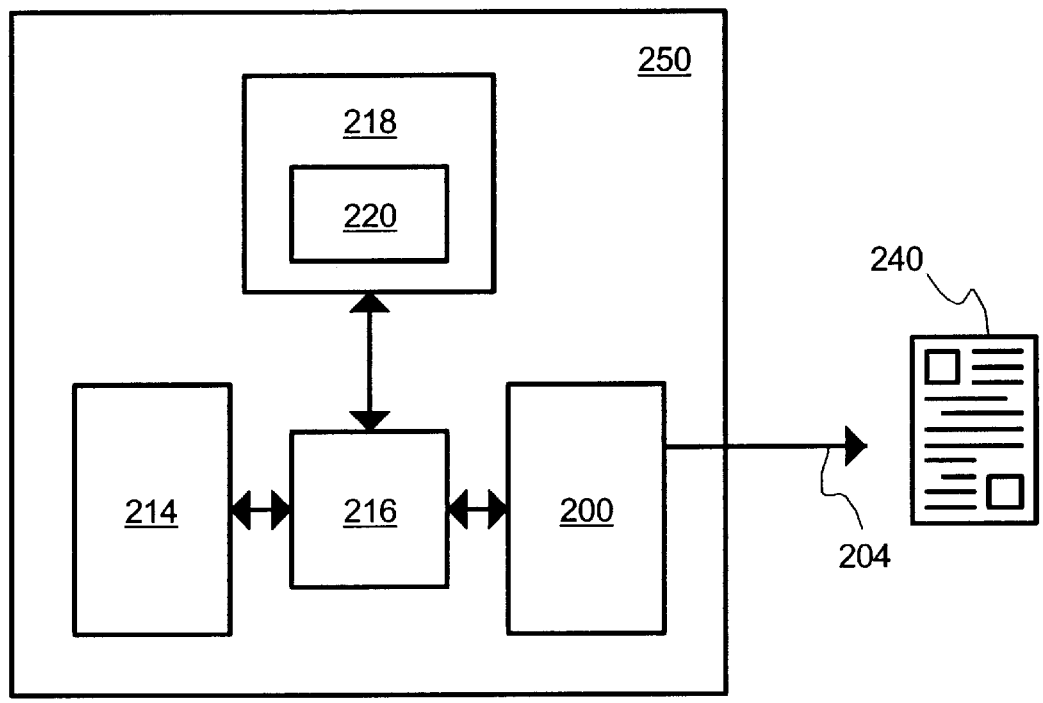
FIG. 2 is a schematic of an imaging system in accordance with an embodiment of the invention.

FIG. 2 is a schematic of an imaging system 250 in accordance with an embodiment of the invention. The imaging system 250 includes an imaging device 200 for generating an output image 240 on an output 204. The imaging system 250 further includes a processor 216. The processor 216 is adapted to direct the imaging device 200 to generate the output image 240 having a quality associated with a value relationship chosen by a user of the imaging system 250.

The processor 216 directs the imaging device 200 in response to computer-readable instructions stored on a computer-usable media 218 and in response to input received from the user via user interface 214. The imaging system 250 may be self-contained, i.e., the image data used to render and produce the output image 240 may be generated within the imaging system 250. For example, the computer-usable media 218 may contain a database 220 or other computer-readable file of information used by the processor 216 to generate the image data for input to the imaging device 200. One particular example would be a kiosk used to produce customized newsprint, where the database 220 contains information corresponding to the available news articles and where the processor 216 generates the image data in response to a selection by the user of all or some subset of the news articles contained in the database 220. Alternatively, the database 220 or similar information may be contained on some external device (not shown) in communication with the processor 216 for use in generating the image data.

As with the user interface 114 of FIG. 1, the user interface 214 may include mechanisms for receiving, recording, displaying or otherwise indicating a cost owed by the user.

Likewise, the imaging system 250 may provide an indication on the output image 240 of the cost owed by the user. Furthermore, the imaging system 250 may include an image generator such as described with reference to FIG. 1.

The processor 216 can use a variety of methods to generate the output image 240 having the desired quality. For one embodiment, the processor 216 provides image data to the imaging device 200 that corresponds to the quality associated with the selected value relationship. For a further embodiment, the processor 216 provides direction to the imaging device 200 to render the image data in accordance with the quality associated with the selected value relationship. For a still further embodiment, the processor 216 provides direction to the imaging device 200 to produce the output image in accordance with the quality associated with the selected value relationship.

Figure 3:
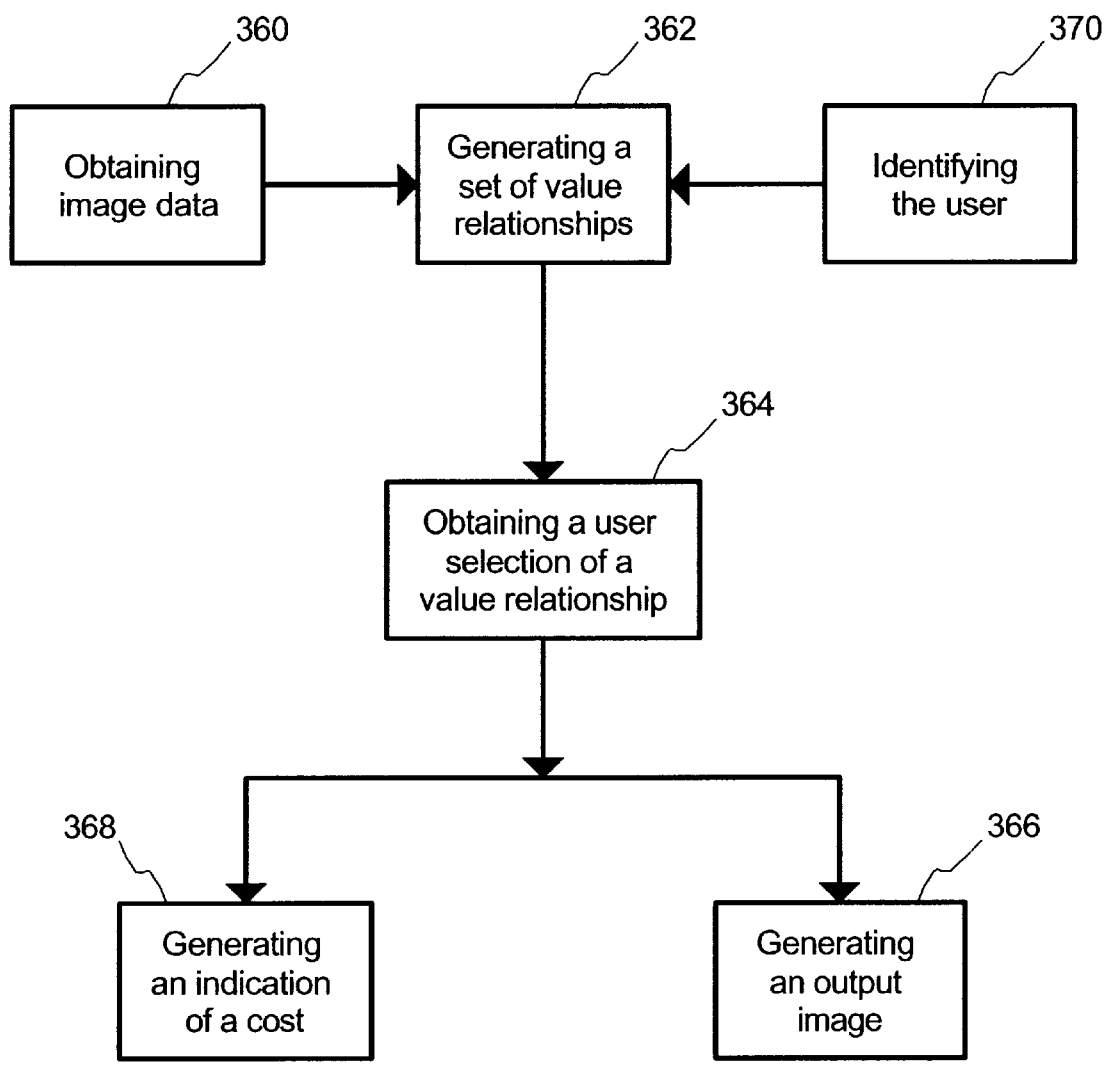
FIG. 3 is a flowchart of a method of generating an output image in accordance with an embodiment of the invention.

FIG. 3 is a flowchart of a method of generating an output image in accordance with an embodiment of the invention. A set of one or more value relationships are generated at box 362. These value relationships include a cost to a user to receive an output image having a corresponding quality. The cost may be based at least in part on image data obtained at box 360, but may also be based merely on average costs for an output image having the corresponding quality. The set of value relationships may be based on a set of predefined qualities or it may be based on the user building a single value relationship through an interactive process of selecting individual quality items. Furthermore, the set of value relationships may have a default value relationship based on identifying the user at box 370 and choosing the default value relationship based on a past behavior of the identified user.

At box 364, the user selects one of the value relationships. For one embodiment, selecting a value relationship includes selecting one value relationship from a list of value relationships. For another embodiment, selecting a value relationship includes the user confirming a value relationship built through the interactive process.

The output image is generated at box 366 to provide a tangible form of the desired image having the quality associated with the selected value relationship. The method may further include generating an indication of the cost at box 368 for incorporation on the output image generated at box 366. As an alternative to providing the indication on the output image itself, the indication may be provided as a separate image (e.g., a receipt or invoice) generated contemporaneously with the output image.

The various embodiments facilitate providing a user of an imaging device or system the opportunity to pay a reduced cost for a reduced image quality. Imaging devices are generally capable of producing output images having a variety of qualities. Each quality has an associated cost. A user may be willing to accept a reduced quality of an output image in exchange for a reduced cost owed by the user.

CONCLUSION

Methods and apparatus have been described to facilitate allowing a user to vary the quality of an output image in exchange for a variable cost. Each quality has an associated cost. By allowing the user to select a value relationship of a quality and its associated cost, the user is provided with an opportunity to receive an output image that provides the most value to the user.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any such adaptations or variations of the invention. It is manifestly intended that this invention be limited only by the following claims and equivalents thereof.

What is claimed is:

1. A method of generating an output image, comprising:
   generating a set of one or more value relationships associated with producing the output image, wherein each value relationship comprises a cost to a user to receive the output image having a corresponding quality; and
   generating the output image in response to a user selection of one of the value relationships, wherein the output image has the quality associated with the selected value relationship;
   wherein a quality includes at least one characteristic selected from the group consisting of an output resolution, an output rate and a color type.

2. The method of claim 1, further comprising:
   generating the output image in response to the user selection of one of the value relationships only after receiving a payment from the user for the cost associated with the selected value relationship.

3. The method of claim 1, wherein generating a set of one or more value relationships comprises an interactive process of the user building a value relationship.

4. The method of claim 1, further comprising:
   generating an indication of a cost owed by the user for generating the output image.

5. A method of generating an output image, comprising:
   generating a set of one or more value relationships associated with producing the output image, wherein each value relationship comprises a cost to a user to receive the output image having a corresponding quality;
   generating the output image in response to a user selection of one of the value relationships, wherein the output image has the quality associated with the selected value relationship; and
   generating an indication of a cost owed by the user for generating the output image, wherein generating an indication of a cost owed by the user further comprises providing the indication on the output image as either a human-readable or a computer-readable indicia.

6. A method of generating an output image, comprising:
   generating a set of one or more value relationships associated with producing the output image, wherein each value relationship comprises a cost to a user to receive the output image having a corresponding quality;
   generating the output image in response to a user selection of one of the value relationships, wherein the output image has the quality associated with the selected value relationship; and
   generating a cost owed by the user for generating the output image based at least in part on an actual usage of consumables used to generate the output image.

7. A method of generating an output image, comprising:
   generating a set of one or more value relationships associated with producing the output image, wherein each value relationship comprises a cost to a user to receive the output image having a corresponding quality;

generating the output image in response to a user selection of one of the value relationships, wherein the output image has the quality associated with the selected value relationship;

identifying the user; and providing a default value relationship to the user based on past behaviors of the user.

8. The method of claim 7, wherein the past behavior of the user is selected from the group consisting of a most-recently selected quality, a most-commonly selected quality, a highest selected quality, a lowest selected quality and user-designated default quality.

9. An imaging device, comprising:

a formatter for rendering image data into a printable image;

a print engine for producing an output image from the printable image; and a processor;

wherein the processor is adapted to generate a first cost to a user of the imaging device to receive the output image having a first quality and to generate a second cost to the user of the imaging device to receive the output image having a second quality;

wherein the processor is adapted to direct the formatter and the print engine, as necessary, to generate the output image in accordance with the first quality if the user selects either the first quality or the first cost; and wherein the processor is adapted to direct the formatter and the print engine, as necessary, to generate the output image in accordance with the second quality if the user selects either the second quality or the second cost.

10. The imaging device of claim 9, wherein directing the formatter comprises changing a resolution level and wherein directing the print engine comprises changing at least one item selected from the group consisting of an output rate, a consumable usage rate, a print media type, a color type and a finish.

11. The imaging device of claim 9, wherein the processor is further adapted to generate the first cost and the second cost in response to interactive changes by the user to selections of quality items making up each quality of the output image.

12. The imaging device of claim 9, further comprising:

wherein the processor is further adapted to generate a third cost to the user of the imaging device to receive the output image having a third quality; and wherein the processor is further adapted to direct the formatter and the print engine, as necessary, to generate the output image in accordance with the third quality if the user selects either the third quality or the third cost.

13. The imaging device of claim 9, further comprising:

an image generator for generating the image data.

14. An imaging system, comprising:

an imaging device for generating an output image in response to image data;

a processor adapted to generate a set of one or more value relationships associated with producing the output image, wherein each value relationship comprises a cost to a user to receive an output image having a corresponding quality; and a user interface for communicating the set of value relationships to the user and for accepting a selection of one of the value relationships by the user;

wherein the processor is further adapted to direct the imaging device to generate the output image having the quality associated with the value relationship selected by the user; and wherein a quality includes at least one characteristic selected from the group consisting of an output resolution, an output rate and a color type.

15. The imaging system of claim 14, further comprising:

an image generator for generating the image data.

16. The imaging system of claim 14, further comprising:

a computer-readable file containing information;

wherein the processor is further adapted to generate the image data from the information contained in the computer-readable file.

17. The imaging system of claim 14, wherein the imaging device is selected from the group consisting of a copier, a printer and a multi-function device.

18. The imaging system of claim 14, wherein each quality comprises at least one item selected from the group consisting of a resolution level, a color type, a media type, an output speed, a finish and a consumable usage level.

19. The imaging system of claim 14, wherein cost is generated in response to at least one item selected from the group consisting of an expected consumable usage, an expected media usage and an expected mechanical wear of the imaging device.

20. The imaging system of claim 14, wherein the processor is adapted to direct the imaging device to generate the output image having the quality associated with the selected value relationship using at least one method selected from the group consisting of providing image data to the imaging device that corresponds to the quality associated with the selected value relationship, providing direction to the imaging device to render the image data in accordance with the quality associated with the selected value relationship and providing direction to the imaging device to produce the output image in accordance with the quality associated with the selected value relationship.

21. A method of generating an output image at an imaging device, comprising:

presenting a set of two or more predetermined value relationships to a user of the imaging device, wherein each predetermined value relationship comprises a cost to a user to receive the output image at the imaging device having a corresponding quality; and generating the output image at the imaging device in response to a user selection of one of the predetermined value relationships, wherein the output image has the quality associated with the selected predetermined value relationship.

22. A method of generating an output image at an imaging device, comprising:

generating a set of one or more value relationships associated with producing the output image, wherein each value relationship comprises a cost to a user to receive the output image having a corresponding quality;

generating the output image in response to a user selection of one of the value relationships, wherein the output image has the quality associated with the selected value relationship;

generating an indication of a cost owed by the user for generating the output image having the quality associated with the selected value relationship; and storing the cost owed by the user for communication to or retrieval by an administrator of the imaging device.

23. A method of generating an output image at an imaging device, comprising:

generating a set of one or more value relationships associated with producing the output image, wherein each value relationship comprises a cost to a user to receive the output image having a corresponding quality;

generating the output image in response to a user selection of one of the value relationships, wherein the output image has the quality associated with the selected value relationship;

generating an indication of a cost owed by the user for generating the output image having the quality associated with the selected value relationship; and receiving or recording the cost owed by the user.

\* \* \* \* \*